J. L. FRANKS.
INSECT DESTROYER.
APPLICATION FILED JAN. 29, 1921.
1,419,900.
Patented June 13, 1922.
3 SHEETS—SHEET 1.
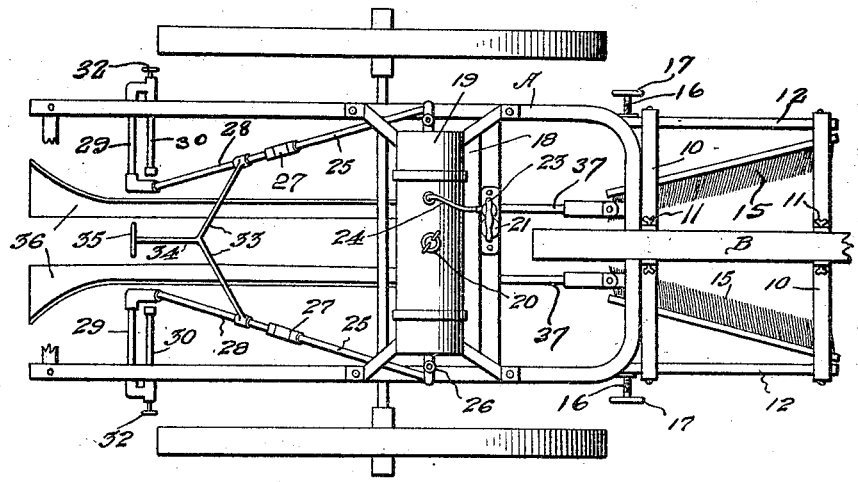
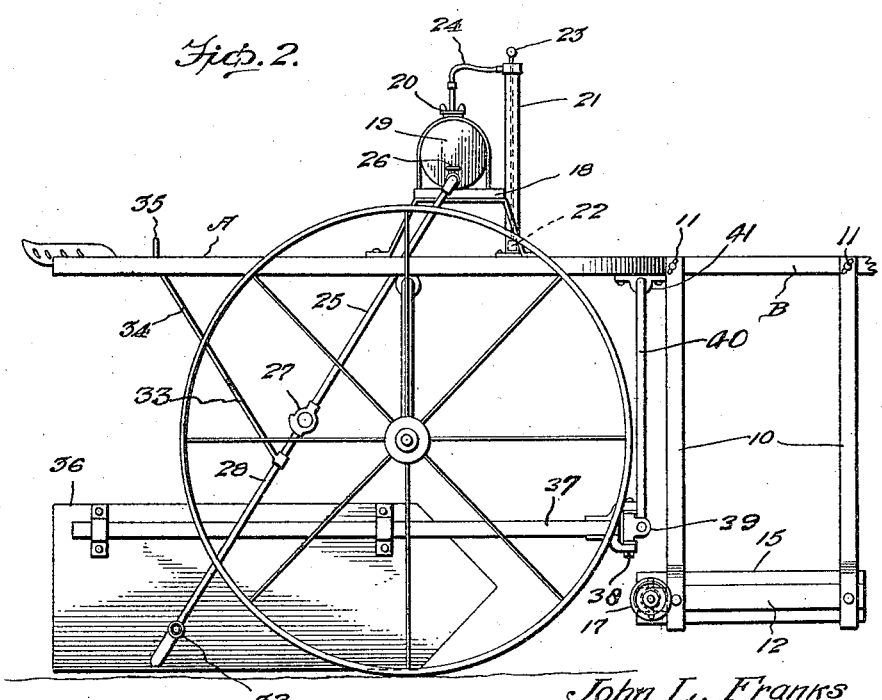
John L. Franks
INVENTOR
BY Victor J. Evans
ATTORNEY
WITNESS:

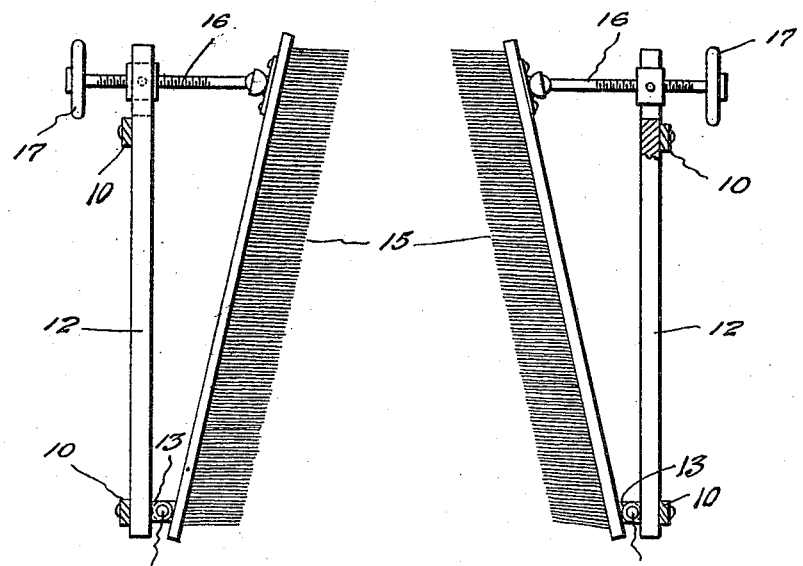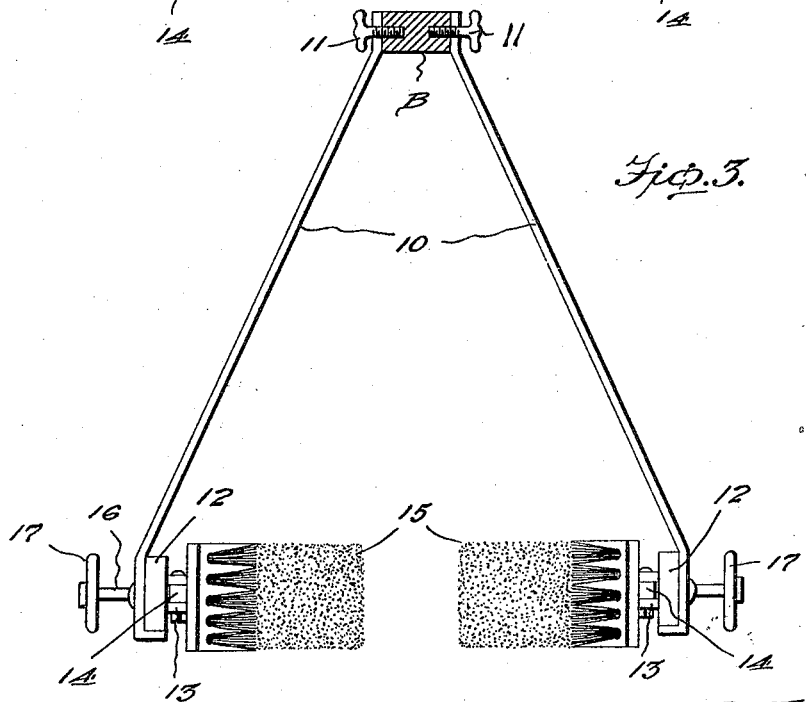

J. L. FRANKS.
INSECT DESTROYER.
APPLICATION FILED JAN. 29, 1921.
1,419,900.
Patented June 13, 1922.
3 SHEETS—SHEET 3.
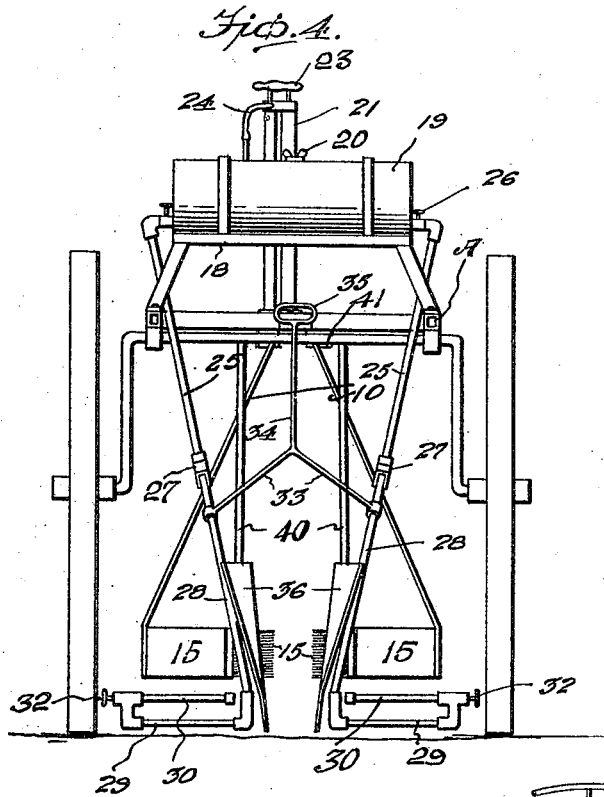
Fig. 4.
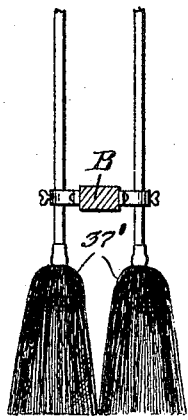
Fig. 7.
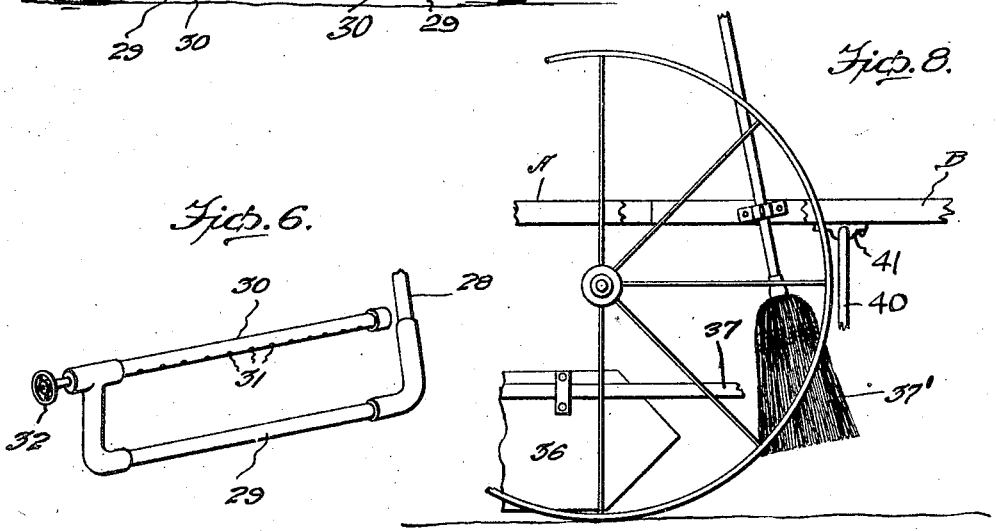
Fig. 6.
Fig. 8.
John L. Franks INVENTOR
BY Victor J. Evans ATTORNEY

UNITED STATES PATENT OFFICE.

JOHN L. FRANKS, OF WINTERS, TEXAS.

INSECT DESTROYER.

1,419,900. Specification of Letters Patent. Patented June 13, 1922.

Application filed January 29, 1921. Serial No. 441,100.

*To all whom it may concern:*

Be it known that I, JOHN L. FRANKS, a citizen of the United States, residing at Winters, in the county of Runnels and State of Texas, have invented new and useful Improvements in Insect Destroyers, of which the following is a specification.

This invention relates to devices for destroying insects, particularly boll weevil, and has for its object the provision of a device adapted to be carried upon a wheeled vehicle of any ordinary or preferred type and including brushes adapted to brush the weevils from the stalks onto the ground, and further including burners for destroying the weevils as they lie upon the ground.

An important object is the provision of a device of this character in which the brushes are adjustable so that the spaces therebetween may be varied, depending upon the row of plants to be treated.

Another object is the provision of a device of this character which inclues a fuel storage tank adapted to contain air under pressure for forcing fuel to the burners and having associated therewith a pump for supplying the pressure.

An additional object is the provision of a device of this character which will be simple and inexpensive in manufacture, easy to operate, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a plan view of the device in position upon a wheeled implement or vehicle, Figure 2 is a side elevation, Figure 3 is a cross sectional detail view showing the brushes in front elevation, Figure 4 is a rear elevation, Figure 5 is an enlarged plan view of the brushes and illustrating the adjusting means therefor, Figure 6 is a detail view of one of the burners, and Figures 7 and 8 are views showing the use of brooms instead of brushes.

Referring more particularly to the drawings, the letter A designates a wheeled vehicle or implement having a tongue B. In carrying out my invention I provide a brush structure detachably mounted upon the tongue B and this brush structure includes two pairs of downwardly diverging arms 10 carrying at their upper ends clamping members 11 detachably engaging the tongue B. Secured upon the lower ends of the arms 10 are bars 12 which extend longitudinally with respect to the vehicle tongue and which are provided at their forward extremities with inward extensions 13. Pivoted, as at 14, upon each extension 13, is a brush 15 which has its rear end swivelly connected with the end of a screw 16 which passes through the bar 12. These brushes are arranged in pairs and converge rearwardly and it will be observed that by properly adjusting the screws 16 by means of the hand wheels 17 thereon the angular positions of the brushes may be varied.

My device further includes a platform 18 suitably secured upon the tongue or other portion of the vehicle and carrying a fuel tank 19 provided with a filling opening normally closed by a cap 20. Associated with and disposed adjacent this tank is a pump 21 of ordinary construction having a piston 22 carrying a handle 23 and this pump carries a hose 24 leading into the top of the tank 19 whereby to place under pressure the fuel, such as gasoline or the like disposed within the tank.

Extending from the ends of the tank are spaced pipes 25, each of which is provided with a cut-off valve 26 and swivelly connected with the lower ends of these pipes, as shown at 27, are other pipes 28 provided at their lower ends with lateral extensions 29 with which are connected burners 30. Each burner 30 is elongated, as shown, and is of the Bunsen type and is provided in its underface with a series of small perforations 31. Each burner of course has a regulating device 32. Connected with the lower ends of the swiveled pipes 28 are brace rods 33 which are connected by a common rod 34 having a handle 35 whereby the height of the burners above the ground may be regulated.

Suitably mounted between the burners are sheet metal shields 36 which are disposed at opposite sides of the plants and which are for the purpose of preventing burning of the plants. The members 36 are fixed upon bars 37 which are pivoted to swing in both a transverse and vertical plane at 38 and 39 respectively. The bars 37 are supported from a member 40 which is rigidly attached to the tongue A at 41. The pivotal connection of the bars 37 allows of vertical swinging movement of the members 36 so that they may pass over stones and the like, while transverse swinging movement is permitted so that the members 36 may pass around large obstacles.

In the operation of the device, the parts being assembled and arranged as above described, the vehicle carrying the device is pulled along the ground in straddling relation to a row of plants to be treated, whereupon the brushes 15 will brush the weevils from the stalks onto the ground so that as the burners 30 pass along the flames issuing therefrom will entirely destroy the weevils as well as the punctured leaves containing the eggs thereof. Owing to the fact that the lower pipes 28 are swiveled and are provided with the rods and handle the burners may be moved up or down, as the case may be, to suit the requirements of the ground traveled over so as to effect thorough burning up of the weevils.

In Figures 7 and 8 I have shown the brushes as replaced by brooms 37 which are vertically and also revolubly adjustable to meet varying conditions and these brooms perform the same function as the brushes.

From the foregoing description and a study of the drawings it will be apparent that I have thus provided a simply constructed and easily operated device by means of which boll weevils and other insects of a like nature may be readily destroyed, the device being inexpensive and being readily capable of installation upon a suitable wheeled vehicle or implement.

While I have shown and described the preferred embodiments of my invention, it is of course to be understood that I reserve the right to make such changes in the form, construction, and arrangement of parts as will not depart from the spirit of the invention or the scope of the subjoined claims.

Having thus described my invention, I claim:

1. An insect destroyer designed as an attachment to a wheeled vehicle and comprising brush members adapted to brush the insects from the plant stalks, a supporting platform carried by the vehicle, a tank mounted on the platform and adapted to contain fuel, a pump for placing said fuel under pressure, outlet pipes leading from the tank, other pipes swivelly connected with the lower ends of said outlet pipes, burners carried by said last named pipes, a handle member connected with said last named pipes whereby to vary the position of the burners, and spaced shields between the burners adapted to pass along the sides of a row of plants.

2. In combination with a wheeled vehicle, an insect destroying apparatus comprising shields carried by the frame and adapted to straddle a row of growing plants, a plurality of burners carried by the frame and located beside said shields, means for supplying fuel to said burners, and means for knocking insects from the plants comprising a pair of rearwardly converging brushes pivoted at their forward ends with respect to said frame, and screw operated means connected with the rear ends of said brushes whereby to vary the inclination thereof.

3. An insect destroying device comprising in combination with a wheeled vehicle, a pair of shields adjustably mounted with respect to and depending from the frame of the vehicle, said shields being adapted to extend in straddling relation to a row of growing plants, adjustable burner members depending from the frame and located outwardly of said shields, means for varying the position of said burners with respect to the ground and with respect to said shields, supporting arms located below the forward end of the frame, a pair of rearwardly converging brushes pivoted at the forward ends of said arms, and screws threaded through the rear ends of said arms and swivelly connected with the rear ends of said brushes whereby to vary the angular inclination thereof.

In testimony whereof I affix my signature.

JOHN L. FRANKS.